United States Patent
Kardos et al.

(10) Patent No.: US 10,830,121 B2
(45) Date of Patent: Nov. 10, 2020

(54) COOLING SYSTEM FOR A COMBUSTION ENGINE AND A WHR SYSTEM

(71) Applicant: Scania CV AB, Södertälje (SE)

(72) Inventors: Zoltan Kardos, Södertälje (SE); Ola Hall, Stockholm (SE)

(73) Assignee: SCANIA CV AB (SE)

( * ) Notice: Subject to any disclaimer, the term of this patent is extended or adjusted under 35 U.S.C. 154(b) by 24 days.

(21) Appl. No.: 16/061,353

(22) PCT Filed: Jan. 11, 2017

(86) PCT No.: PCT/SE2017/050022
§ 371 (c)(1),
(2) Date: Jun. 12, 2018

(87) PCT Pub. No.: WO2017/123141
PCT Pub. Date: Jul. 20, 2017

(65) Prior Publication Data
US 2018/0355781 A1    Dec. 13, 2018

(30) Foreign Application Priority Data
Jan. 15, 2016   (SE) .................................. 1650040-7

(51) Int. Cl.
*F01P 3/20* (2006.01)
*F01P 7/14* (2006.01)
(Continued)

(52) U.S. Cl.
CPC ............... *F01P 3/20* (2013.01); *F01K 9/003* (2013.01); *F01K 15/02* (2013.01); *F01K 23/065* (2013.01);
(Continued)

(58) Field of Classification Search
CPC  F01P 3/20; F01P 7/14; F01P 2007/143; F01P 2007/146; F02G 5/02;
(Continued)

(56) References Cited

U.S. PATENT DOCUMENTS 3,731,488 A    5/1973  Sasakura et al.
6,072,255 A *  6/2000  Chiang ................ A01K 63/042
                                                310/67 R
(Continued)

FOREIGN PATENT DOCUMENTS

DE   10 2011 085 961 A1   5/2013
DE   10 2012 204 262 A1   9/2013
(Continued)

OTHER PUBLICATIONS

Technology Search Report dated Nov. 19, 2014.
(Continued)

*Primary Examiner* — Jacob M Amick
*Assistant Examiner* — Charles Brauch
(74) *Attorney, Agent, or Firm* — Ostrolenk Faber LLP

(57) ABSTRACT

A cooling system for a combustion engine and a WHR-system in a vehicle (1) includes a first line (23) directing coolant at a first temperature ($T_1$) to a condenser (18) of the WHR system, a second line (24) directing coolant at a second temperature ($T_2$) to the condenser (18), a valve arrangement (25, 26, 29) by which the flow rate of the coolant in at least one of the lines (23, 24) is adjustable and a control unit (20) configured to control the valve arrangement (25, 26, 29) such that the coolant directed to the condenser (18) from the lines (23, 24) has a temperature and a flow rate which results in a cooling of the working medium in the condenser (18) to a predetermined condensation temperature/pressure at the actual operating condition.

16 Claims, 1 Drawing Sheet

(51) Int. Cl.
  *F01K 9/00* (2006.01)
  *F01K 23/14* (2006.01)
  *F02G 5/04* (2006.01)
  *F01K 15/02* (2006.01)
  *F01K 23/06* (2006.01)
  *F01K 23/10* (2006.01)
  *F02G 5/02* (2006.01)

(52) U.S. Cl.
  CPC ............ *F01K 23/101* (2013.01); *F01K 23/14* (2013.01); *F01P 7/14* (2013.01); *F02G 5/02* (2013.01); *F02G 5/04* (2013.01); *F02G 2260/00* (2013.01)

(58) Field of Classification Search
  CPC ........ F02G 2260/00; F02G 5/04; F01K 23/14; F01K 9/003; F01K 23/101; F01K 23/065; F01K 15/02; F01K 23/10; Y02T 10/166
  See application file for complete search history.

(56) References Cited

U.S. PATENT DOCUMENTS

| | | | |
|---|---|---|---|
| 2006/0157102 A1 | 7/2006 | Nakajima et al. | 136/205 |
| 2011/0132030 A1* | 6/2011 | Kim | B60H 1/008885 62/507 |
| 2012/0222420 A1 | 9/2012 | Geskes et al. | |
| 2013/0118423 A1 | 5/2013 | Lutz et al. | 123/41.08 |
| 2013/0312418 A1 | 11/2013 | Kardos et al. | 60/668 |
| 2014/0174709 A1* | 6/2014 | Fiveland | F02B 29/0412 165/222 |
| 2014/0260342 A1* | 9/2014 | Pham | F25B 39/04 62/56 |
| 2015/0276284 A1 | 10/2015 | Waibel et al. | |
| 2016/0230643 A1 | 8/2016 | Honda | |

FOREIGN PATENT DOCUMENTS

| | | | |
|---|---|---|---|
| DE | 10 2014 019 684 A1 | 6/2015 | |
| DE | 102014019684 A1 * | 6/2015 | ............ F01K 23/10 |
| EP | 1 923 549 | 5/2008 | |
| EP | 1 925 806 A2 | 5/2008 | |
| EP | 2 280 152 A1 | 2/2011 | |
| JP | 2005-171891 | 6/2005 | |
| JP | 2015-86779 | 5/2015 | |
| KR | 10-2013-0129407 | 11/2013 | |
| WO | WO 2012/082050 | 6/2012 | |
| WO | WO 2015/197091 A1 | 12/2015 | |

OTHER PUBLICATIONS

Notice dated Sep. 9, 2016 in corresponding Swedish Patent Application No. 1650040-7.
International Search Report dated Apr. 20, 2017 in corresponding PCT International Application No. PCT/SE2017/050022.
Written Opinion dated Apr. 20, 2017 in corresponding PCT International Application No. PCT/SE2017/050022.
Supplementary European Search Report dated Jul. 22, 2019 issued in European Patent Application No. 17738724.
Korean Office Action dated Jul. 18, 2019 issued in Korean Patent Application No. 10-2018-7022353 (with English language translation).

* cited by examiner

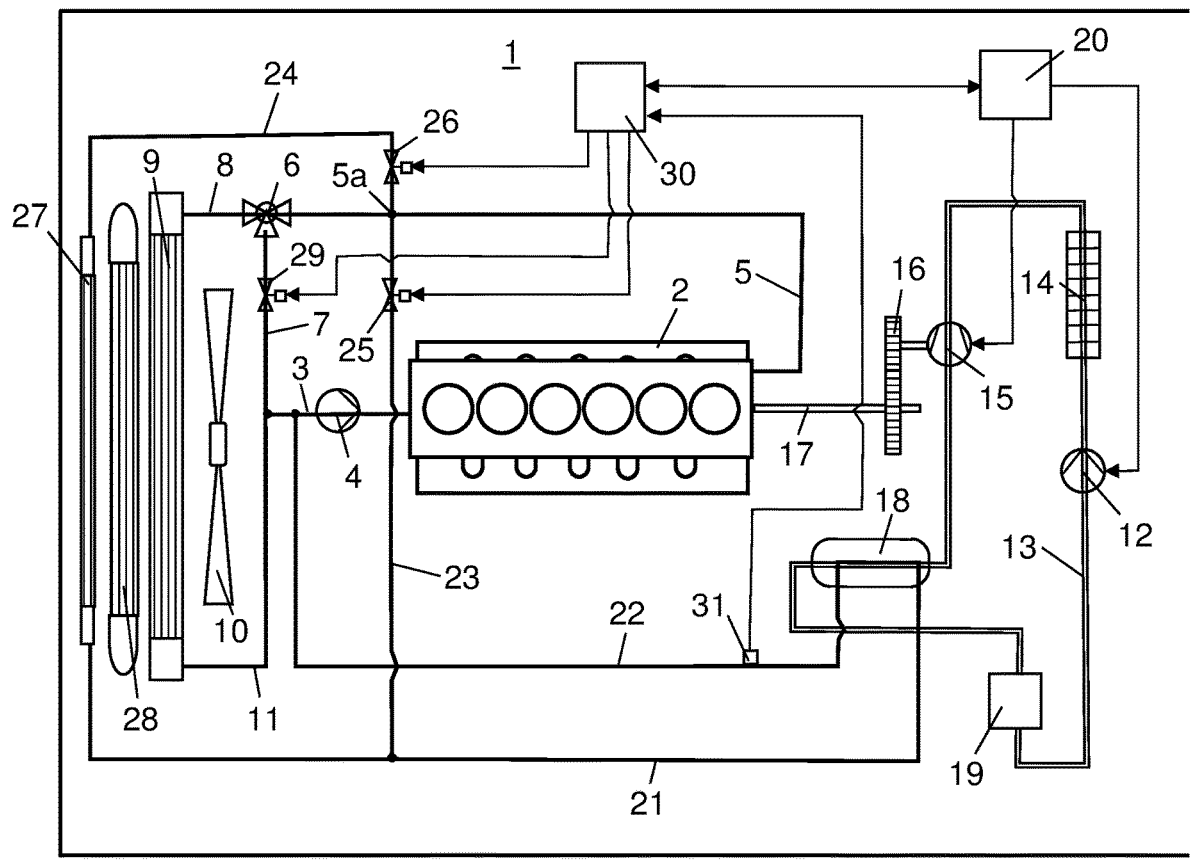

COOLING SYSTEM FOR A COMBUSTION ENGINE AND A WHR SYSTEM

CROSS-REFERENCE TO RELATED APPLICATIONS

The present application is a 35 U.S.C. §§ 371 national phase conversion of PCT/SE2017/050022, filed Jan. 11, 2017, which claims priority of Swedish Patent Application No. 1650040-7, filed Jan. 15, 2016, the contents of which are incorporated by reference herein. The PCT International Application was published in the English language.

TECHNICAL FIELD

The present invention relates to a cooling system for a combustion engine and a WHR-system.

BACKGROUND OF THE INVENTION AND PRIOR ART

A WHR system (Waste Heat Recovery System) can be used in vehicles for recovering waste thermal energy and converting it to mechanical energy or electric energy. A WHR system includes a pump which pressurizes and circulates a working medium in a closed circuit. The circuit comprises one or several evaporators where the working medium is heated and evaporated by one or several heat sources such as the exhaust gases from a combustion engine. The pressurized and heated gaseous working medium is directed to an expander where it expands. The expander generates mechanical energy which can be used to operate the vehicle or apparatuses on the vehicle. Alternatively, the expander is connected to a generator for generating electric energy. The working medium leaving the expander is directed to a condenser. The working medium is cooled down in the condenser to a temperature at which it condenses. The liquefied working medium is redirected to the pump which pressurizes the medium. Thus, the waste heat energy from, for example, the exhaust gases from a combustion engine in a vehicle can be recovered by means of a WHR-system. Consequently, a WHR-system can reduce the fuel consumption of a combustion engine.

In order to achieve a high thermal efficiency in a WHR-system, the working medium in the condenser is to be cooled to a condensation temperature as low as possible and substantially without subcooling. Consequently, in order to achieve a high thermal efficiency in a WHR-system, the working medium has to be cooled with a suitable cooling effect. However, the suitable cooling effect of the working medium in the condenser varies during different operating conditions, such as with the heat effect supplied from, for example, the exhaust gases to the evaporator. Since the supplied heat from exhaust gases can vary rapidly, it is difficult to continuously provide a cooling effect resulting in a high thermal efficiency of a WHR-system.

US 2013/0118423 shows a cooling circuit with a circulating coolant which cools a motor. The cooling circuit comprises a cooling line where the coolant cools a working medium in a condenser of a WHR-system and a bypass line leading the medium past the condenser. The coolant flow through the bypass line is controlled by a relief valve which open at a specific pressure.

SUMMARY OF THE INVENTION

The object of the present invention is to provide a cooling system which is able to provide an adjustment of the cooling effect of a working medium in a condenser of a WHR-system in a quick and simple manner in order to substantially continuously establish a condensation temperature/pressure of the working medium in the condenser at which the WHR system receives a high thermal efficiency.

The above mentioned object is achieved by the cooling system according to the invention. In this case, the cooling system which cools the combustion engine also is used to cool the working medium in the condenser of the WHR system. In order to continuously maintain a high thermal efficiency in a WHR-system, it is necessary to adjust the cooling effect of the working medium in the condenser during different operating conditions. The cooling system comprises two lines directing coolants of two different temperatures to the condenser. By means of a valve arrangement, it is possible to adjust the flow rate of the coolant in at least one of the lines. In case an actual condensation temperature/pressure is too high, the cooling effect is to be increased. In this case, it is possible to adjust the valve arrangement and increase the flow rate in the line directing coolant at the lower temperature to the condenser and/or decrease the flow rate in the line directing coolant at the higher temperature to the condenser. As a consequence, the coolant directed to the condenser receives a lower temperature resulting in an increased cooling effect of the working medium in the condenser and a lower condensation temperature. On the other hand, in case an actual condensation temperature/pressure is too low, it is possible to adjust the valve arrangement and decrease the flow rate in the line directing coolant at the lower temperature to the condenser and/or increase the flow rate in the line directing coolant at the higher temperature to the condenser. As a consequence, the coolant directed to the condenser receives a higher temperature resulting in a decreased cooling effect of the working medium in the condenser and a higher condensation temperature. The adjustment of the temperature as well as the flow rate of the coolant can be performed in a quick and simple manner. It thereby is possible to obtain a substantially continuously high thermal efficiency of the WHR-system during different operating conditions. For practical reasons, it is at many times suitable to avoid negative pressures in a WHR-system. In this case, it is suitable to obtain a condensation pressure just above 1 bar. The predetermined pressure range may, for example, be in the range 1.1-1.5 bar. It is to be noted that a condensation pressure for a working medium has a corresponding condensation temperature.

According to an embodiment of the invention, the second line comprises a second radiator in which the coolant is cooled to the second temperature before it is directed to the condenser. In this case, it is possible to provide a considerably lower coolant temperature in the second line than in the first line. The temperature of the coolant directed to the condenser is adjustable within the temperature range defined by the coolant temperatures in the two lines. The ability to control the temperature of the coolant directed to the condenser and the cooling effect of the working medium in the condenser increases with the size of the temperature range. The coolant may be cooled in the first radiator and in the second radiator by an air flow. The first radiator and the second radiator may be cooled by a common air flow, wherein the second radiator is positioned upstream of the first radiator in the airflow. In this case, the coolant in the second line may be cooled to a temperature close to ambient temperature. The radiators may be arranged at a front portion of a vehicle.

According to an embodiment of the invention, the valve arrangement comprises a first valve member configured to regulate the flow rate in the first line and a second valve member configured to regulate the flow rate in the second line. In this case, it is possible to regulate the flow rates in the lines individually and substantially independently of each other. The cooling system may comprise a third valve member configured to regulate the flow rate in a bypass line. During an operating condition when a thermostat directs coolant to the bypass line, it is possible to reduce the coolant flow in the bypass line by a third valve member. When the third valve member reduces the coolant flow through the bypass line, the coolant flow through the first line and the second line increases. Consequently, a more or less closed third valve results in an increased flow rate to the condenser. Thus, it is possible to vary the coolant flow to the condenser by means of the third valve member in an effective manner and thus vary the cooling effect of the working medium in the condenser. Preferably, at least one of the valve members regulates the coolant flow in a step-less manner. This makes it possible to adjust the coolant flow with high accuracy as well as the cooling effect of the working medium in the condenser.

According to an embodiment of the invention, the first line directs coolant to the condenser from a line in the cooling system located downstream of the combustion engine and upstream of the thermostat. In this case, coolant at the highest temperature in the cooling system is directed to the condenser via the first line. A high coolant temperature in the first line favors a large temperature difference between the coolants in the two lines. The second line may direct coolant to the condenser from a line in the cooling system located downstream of the combustion engine and upstream of the thermostat. In this case, the first line and the second line direct coolant from the same line in the cooling system.

According to an embodiment of the invention, the cooling system comprises a condenser inlet line in which the coolants from the lines are directed to the condenser. The condenser inlet line may be designed such that the coolants from the two lines are well mixed before they enter the condenser. The cooling system may comprise a condenser outlet line directing the coolant from the condenser to an engine inlet line. In this case, it is possible to use the heated coolant from the condenser to heat the combustion engine in a relatively quick manner to its operating temperature after a cold start.

According to an embodiment of the invention, the cooling system may comprise a sensor for sensing a parameter related to the actual condensing temperature/pressure of the working medium in the condenser. A condition for enabling adjustment of the actual condensation temperature/pressure to a predetermined temperature/pressure during different operating conditions is to receive information about the actual condensation temperature/pressure. Such a sensor may sense the pressure or the temperature in the condenser. Alternatively, it may sense the temperature of the coolant leaving the condenser. The temperature of the coolant leaving the condenser is strongly related to the condensation temperature. The control unit may be configured to estimate an actual condensation temperature of the working medium in the condenser by means of the parameter, to compare the actual condensation temperature with a predetermined condensation temperature at the actual operating condition, and to control the valve arrangement in order to eliminate a possible difference between the actual condensation temperature and the predetermined condensation temperature. The control unit may have access to stored values of predetermined condensation temperatures/pressures at different operating conditions.

According to an embodiment of the invention, the working medium in the WHR-system is ethanol. Ethanol has an evaporation temperature of about 78° C. at 1 bar. It is relatively easy to cause a coolant temperature at a suitable level below the evaporation temperature of ethanol and to cool the ethanol in a condenser to a condensation temperature just above 78° C. However, it is possible to use other working mediums, such as R245fa.

According to an embodiment of the invention, the working medium is heated in an evaporator of the WHR-system by means of exhaust gases from the combustion engine. The exhaust gases from a combustion engine contain a lot of heat energy, which usually is supplied to the environment. By means of a WHR-system, it is possible to recover a large part of the heat energy in the exhaust gases.

BRIEF DESCRIPTION OF THE DRAWING

In the following a preferred embodiment of the invention is described, as an example, with reference to the attached drawing, in which:

The FIGURE shows a cooling system according to a preferred embodiment of the invention.

DESCRIPTION OF A PREFERRED EMBODIMENT OF THE INVENTION

The FIGURE shows a combustion engine 2 powering a schematically disclosed vehicle 1. The combustion engine 2 may be a diesel engine. The vehicle 1 may be a heavy vehicle. The vehicle 1 comprises a cooling system comprising an engine inlet line 3 provided with a pump 4 circulating a coolant in the cooling system. The pump 4 circulates the coolant to the combustion engine 2. When the coolant has circulated through the combustion engine 2, it is received in an engine outlet line 5. A thermostat 6 is arranged at an end of the engine outlet line 5. In case the coolant has a lower temperature than a regulating temperature of the thermostat 6, the coolant is directed back to the engine inlet line 3 and the pump 4 via a bypass line 7. In case the coolant has a higher temperature than the regulating temperature of the thermostat 6, a radiator inlet line 8 directs the coolant to a first radiator 9 arranged at a front portion of the vehicle 1. The ram air and a radiator fan 10 provide a cooling air flow through the first radiator 9. When the coolant has circulated through the first radiator 9, it is directed back, via a return line 11, to the engine inlet line 3 and the pump 4.

The vehicle is provided with a WHR-system (Waste Heat Recovery system). The WHR-system comprises a pump 12 which pressurizes and circulates a working medium in a closed a circuit 13. In this case, the working medium is ethanol. However, it is possible to use other kinds of working mediums, for example R245fa. The pump 12 pressurizes and circulates the working medium to an evaporator 14. The working medium is heated in the evaporator 14 by, for example, exhaust gases from the combustion engine. The working medium is heated in the evaporator 14 to a temperature at which it evaporates. The working medium is circulated from the evaporator 14 to the expander 15.

The pressurised and heated working medium expands in the expander 15. The expander 15 generates a rotary motion which is transmitted, via a suitable mechanical transmission 16, to a shaft 17 of the power train of the vehicle 1. Alternatively, the expander 15 may be connected to a generator transforming mechanical energy into electrical energy. The electrical energy may be stored in a battery. After the working medium has passed through the expander 15, it is directed to a condenser 18. The working medium is cooled in the condenser 18 by the coolant from the cooling system to a temperature at which he working medium condenses. The working medium is directed from the condenser 18 to a receiver 19. The pump 12 sucks working medium from the bottom of the receiver 19 ensuring that only working medium in a liquid state is supplied to the pump 12. A first control unit 20 controls the operation of the WHR-system. The first control unit 20 controls the operation of the pump 12 and the expander 15. The WHR-system makes it possible to transform thermal energy from the exhaust gases to mechanical energy or electrical energy.

The heat energy of exhaust gases and thus the heating of the working medium in the evaporator 14 varies during different operation conditions. In order to achieve a high thermal efficiency in the WHR-system, the working medium in the condenser 18 is to be cooled with a corresponding varying cooling effect. It is favorable to establish a condensation pressure as low as possible at the different operating conditions. However, it is suitable to avoid negative pressure in the WHR-system for practical reasons. In view of these facts, it is suitable to provide a cooling of the working medium in the condenser 18 to a condensation pressure just above 1 bar.

Consequently, in order to maintain a high thermal efficiency, it is necessary to adjust the cooling effect of the working medium in the condenser 18 in view of the supplied heat energy from the exhaust gases such that the condensation pressure will be just above 1 bar. The working medium ethanol has a condensation temperature of 78° C. at the condensation pressure 1 bar. In this case, it is suitable to accomplish a condensation temperature of just above 78° C. in the condenser 18.

The cooling system comprises a circuit cooling the working medium in the condenser 18. The circuit comprises a condenser inlet line 21 directing coolant to the condenser 18 and a condenser outlet line 22 directing coolant back from the condenser 18 to the engine inlet line 3 of the cooling system. The circuit comprises a first line 23 and a second line 24 directing coolant in parallel lines from a position 5a of the engine outlet line 5 to the condenser inlet line 21. The first line 23 comprises a first valve member 25 regulating the coolant flow in the first line 23 in a step-less manner. The coolant in the first cooling line has a temperature $T_1$. The temperature $T_1$ may be in the temperature range of 90-100° C. The second line 24 comprises a second valve member 26 regulating the coolant flow in the second line 24 in a step-less manner and a second radiator 27 arranged in a position in front of the first radiator 9 at a front portion of the vehicle 1. The coolant is cooled in the second radiator 27 by air of ambient temperature. The coolant in the second line 24 has a temperature $T_2$ when it leaves the second radiator 27. The temperature $T_2$ may be within the temperature range of 30-50° C. During all circumstances, the coolant temperature $T_2$ is considerably lower than the coolant temperature $T_1$. Thus, the first line 23 and the second line 24 direct coolants with different temperatures to the condenser 18. The coolants are mixed in the condenser inlet line 21 before they enter the condenser in the form of a substantially homogeneous coolant. The temperature and the flow rate of the coolant entering the condenser 18 depends on the temperatures $T_1$, $T_2$ and the flow rates of the coolants in the two parallel lines 23, 24. A charge air cooler 28 is arranged between the first radiator 9 and the second radiator 27. A third valve member 29 regulates the coolant flow in the bypass line 7 in a step-less manner. A second control unit 30 for the cooling system controls the valve members 25, 26, 29 and thus the coolant flow through the first line 23, the second line 24 and the bypass line 7. A sensor 31 senses the temperature of the coolant leaving the condenser 18.

During operation of the combustion engine 2, the pump 4 circulates coolant in the cooling system and through the combustion engine 2. A first part of the coolant in the engine outlet line 5 with the temperature $T_1$ is directed into the first line 23 and to the condenser inlet line 21. A second part of the coolant in the engine outlet line 5 is directed into the second line 24 and to the second radiator 27. The coolant leaving the second radiator 27 has a temperature $T_2$. A third part of the coolant is directed to the thermostat 6. During operating conditions when the coolant in the engine outlet line 5 has a lower temperature than the regulating temperature of the thermostat 6, the thermostat 6 directs the third part of the coolant to the bypass line 7. During operating conditions when the coolant in the engine outlet line 5 has a higher temperature than the regulating temperature of the thermostat 6, the thermostat 6 directs the third part of the coolant to the first radiator 9.

The second control unit 30 receives information from the first control unit 20 about the operating condition of the WHR system and the temperature of the coolant leaving the condenser 18 from the sensor 31. In view of this information, the second control unit 30 estimates the actual condensation temperature/pressure of the working medium in the condenser 18. The control unit 20 has access to stored information about desired condensation temperatures/pressures of the working medium at different operating conditions. The control unit 20 compares the actual condensation temperature/pressure with the predetermined condensation temperature/pressure at the actual operating condition.

In case the estimated actual condensation temperature/pressure is higher than the predetermined condensation temperature/pressure, an increased cooling effect of the working medium in the condenser 18 is required. The cooling effect of the working medium is related to the temperature and the flow rate of the coolant entering the condenser 18. In this case, the control unit 20 controls the second valve member 26 such that the coolant flow through the second line 24 increases. Alternatively or in combination, the control unit 20 controls the first valve member 25 such that the coolant flow through the first line 23 decreases. In this case, the coolant directed to the condenser 18 includes a higher content of coolant from the second line 23 at the lower temperature $T_2$ and a lower content of coolant from the first line 23 at the higher temperature $T_1$. As a consequence, coolant with a lower temperature is directed to the condenser 18 resulting in an increased cooling effect of the working medium in the condenser 18 and a lower condensation temperature/pressure. Alternatively or in combination, the control unit 20 controls the first valve member 25 and the second member 26 such that the total flow of coolant to the condenser 18 increases, which also increases the cooling effect of the working medium.

In case the estimated actual condensation temperature is lower than the desired condensation temperature, a decreased cooling effect of the working medium in the condenser 18 is required. In this case, the control unit 20 controls the first valve member 25 such that the coolant flow through the first line 23 increases. Alternatively or in combination, the control unit 20 controls the second valve member 26 such that the coolant flow through the second line 24 decreases. In this case, the coolant directed to the condenser 18 includes a higher content of coolant from the first line at the higher temperature $T_1$ and a lower content of coolant from the second line 24 at the lower temperature $T_2$.

As a consequence, coolant with a higher temperature is directed to the condenser 18 resulting in a decreased cooling effect of the working medium in the condenser 18 and a higher condensation temperature. Alternatively or in combination, the control unit 20 may control the first valve member 25 and the second member 26 such that the total flow of coolant to the condenser 18 decreases and thus the cooling effect of the working medium in the condenser 18 decreases.

During operating condition when the thermostat 6 directs coolant to the bypass line 7, the control unit 20 also has the possibility to control the third valve member 29 in order to vary the cooling effect of the working medium in the condenser 18. It is possible to throttle the coolant flow through the bypass line 7 by the third valve member 29. When the third valve member 29 is closing, the flow rate through the bypass line 7 will decrease. As a consequence, the flow rates through the first line 23 and the second line 24 will increase and the total amount of coolant directed to the condenser 18 increases. Consequently, it is possible to vary the coolant flow rate to the condenser 18 by means of the third valve member 29 and thus vary the cooling effect of the working medium in the condenser 18. During a cold start of the combustion engine 2, it can be favorable to direct a relatively large part of the coolant in the cooling system to the condenser 18 by means of the third valve member 29. In this case, the coolant is heated in the condenser 18 in a first step and in the combustion engine 2 in a second step, resulting in a fast heating of the coolant and the combustion engine to its operating temperature.

The invention is not restricted to the described embodiment but may be varied freely within the scope of the claims.

The invention claimed is:

1. A cooling system for a combustion engine and for a WHR-system in a vehicle, comprising:
    an engine outlet line that directs a circulating coolant from the combustion engine;
    a first radiator configured to cool the circulating coolant that circulates through the first radiator;
    a bypass line that receives the circulating coolant from the engine outlet line and is configured for bypassing the circulating coolant past the first radiator;
    a thermostat configured and operable to direct the circulating coolant to the first radiator when the circulating coolant has a higher temperature than a regulating temperature of the thermostat and to the bypass line past the first radiator when the circulating coolant has a lower temperature than the regulating temperature;
    a condenser of the WHR-system configured to cool a working medium in the condenser, the condenser having an inlet line and an outlet line outside the condenser;
    a first line that receives the circulating coolant from the engine outlet line and is configured and operable to direct coolant which is at a first temperature to the inlet line of the condenser of the WHR-system;
    a second line that receives the circulating coolant from the engine outlet line and is configured and operable to direct coolant at a second temperature to the inlet line of the condenser;
    a valve arrangement configured and operable to adjust a flow rate of the coolant in at least one of the first and second lines, the valve arrangement including a first valve in the first line, a second valve in the second line, and a third valve in the bypass line;
    a sensor located and configured for sensing a parameter of the working medium in the outlet line of the condenser that is related to the actual condensation temperature/pressure of the working medium in the condenser;
    a control unit configured to control the valves of the valve arrangement based on an estimate of an actual condensation temperature of the working medium in the condenser, the control unit being configured to control, based on the estimate, the valves of the valve arrangement such that the total amount of coolant directed to the inlet line of the condenser from the first and second lines has a temperature and a flow rate which results in a cooling of the working medium in the condenser to a predetermined condensation temperature/pressure at an actual operating condition, and another control unit configured to determine, based on the parameter, the estimate of the actual condensation temperature of the working medium in the condenser and to send the estimate to the control unit; and
    the second line comprises a second radiator in which the coolant is cooled to a second temperature before the coolant is directed to the condenser.

2. A cooling system according to claim 1, further comprising the first radiator being in a position to have an air flow past the first radiator such that the air flow cools the coolant in the first radiator and in the second radiator.

3. A cooling system according to claim 2, wherein the first and the second radiators are configured and located such that the coolant in the first radiator and the coolant in the second radiator are cooled by a common air flow; and
    the second radiator is positioned in an upstream position in relation to the first radiator with respect to the air flow.

4. A cooling system according to claim 1, further comprising:
    the valve arrangement comprises the first valve member configured to regulate the flow rate in the first line and the second valve member configured to regulate the flow rate in the second line.

5. A cooling system according to claim 4, further comprising:
    the third valve member configured to regulate the flow rate in the bypass line.

6. A cooling system according to claim 5, further comprising:
    at least one of the valve members is configured to regulate the coolant flow in a step-less manner.

7. A cooling system according to claim 1, further comprising:
    the first line is configured to direct coolant to the condenser from a line in the cooling system located downstream of the combustion engine and upstream of the thermostat in an air flow direction.

8. A cooling system according to claim 1, further comprising:
    the second line is configured to direct coolant to the condenser from a line in the cooling system located downstream of the combustion engine and upstream of the thermostat in an air flow direction.

9. A cooling system according to claim 1, further comprising:
    a condenser inlet line in which the coolants from the first and second lines are mixed before the coolants reach the condenser.

10. A cooling system according to claim 1, further comprising:
    the cooling system comprises a condenser outlet line configured to direct the coolant from the condenser to an engine inlet line.

11. A cooling system for a combustion engine and for a WHR-system
in a vehicle, comprising:
a first radiator configured to cool a circulating coolant that circulates through the first radiator;
a bypass line configured for bypassing the circulating coolant past the first radiator;
a thermostat configured and operable to direct the circulating coolant to the first radiator when the circulating coolant has a higher temperature than a regulating temperature of the thermostat and to the bypass line past the first radiator when the circulating coolant has a lower temperature than the regulating temperature;
a condenser of the WHR-system configured to cool a working medium in the condenser;
a first line configured and operable to direct coolant which is at a first temperature to the condenser of the WHR-system, a second line configured and operable to direct coolant at a second temperature to the condenser;
a valve arrangement configured and operable to adjust a flow rate of the coolant in at least one of the first and second lines;
a control unit configured to control the valve arrangement such that the total amount of coolant directed to the condenser from the first and second lines has a temperature and a flow rate which results in a cooling of the working medium in the condenser to a predetermined condensation temperature/pressure at an actual operating condition;
the second line comprises a second radiator in which the coolant is cooled to a second temperature before the coolant is directed to the condenser;
a sensor located and configured for sensing a parameter related to the actual condensation temperature/pressure of the working medium in the condenser; and
a control unit configured to estimate an actual condensation temperature/pressure of the working medium in the condenser by means of a parameter, to compare the actual condensation temperature/pressure with a predetermined condensation temperature/pressure at the then actual operating condition, and to control the valve arrangement to eliminate a possible difference between the actual condensation temperature/pressure and the predetermined condensation temperature/pressure.

12. A cooling system according to claim 1, further comprising the working medium in the WHR-system is ethanol.

13. A cooling system according to claim 1, further comprising:
an evaporator of the WHR-system configured and located for heating the working medium by means of exhaust gases from the combustion engine.

14. A cooling system according to claim 1, further comprising:
a first radiator circuit including the first radiator therein, the first radiator circuit being configured to circulate coolant through the first radiator, the first radiator circuit passing through the engine for passing the coolant through the engine;
the bypass line being connected to the coolant circuit and also bypassing the first radiator;
the thermostat being in the coolant circuit, located and operable to selectively direct the circulating coolant to the first radiator and to the bypass line, and the bypass line also passing the coolant in the engine for cooling the engine;
a working medium circuit, the condenser is located at the working medium circuit, the coolant circuit passes the condenser such that working medium in the condenser is cooled at the condenser by the coolant in the coolant circuit;
the first line communicating from the coolant circuit to the condenser, and the second line communicating from the second radiator to the condenser, for supplying coolant to the condenser; and
the valve arrangement includes valves communicating with the first and second lines, the valve arrangement is operable to adjust a flow rate of coolant in at least one of the first and second lines for adjusting the cooling of the working medium in the condenser.

15. A cooling system according to claim 1, wherein the first line, the second line, and the bypass line receive circulating coolant from the same position within the cooling system.

16. A cooling system according to claim 1, wherein the first line, the second line, and the bypass line receive circulating coolant directly from the engine outlet line.

* * * * *